US007791619B2

(12) United States Patent
Kim et al.

(10) Patent No.: US 7,791,619 B2
(45) Date of Patent: Sep. 7, 2010

(54) DISPLAY APPARATUS AND SYSTEM COMPRISING PIVOT SENSING APPARATUS, AND METHOD FOR SENSING A PIVOT ANGLE

(75) Inventors: Jin-Hun Kim, Seoul (KR); Young-Chan Kim, Uiwang-si (KR); Jae-Hyung Chang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 952 days.

(21) Appl. No.: 11/189,001

(22) Filed: Jul. 26, 2005

(65) Prior Publication Data

US 2006/0146073 A1 Jul. 6, 2006

(30) Foreign Application Priority Data

Jan. 5, 2005 (KR) ..................... 10-2005-0000747

(51) Int. Cl.
*G09G 5/00* (2006.01)

(52) U.S. Cl. ...................................... 345/659; 345/649

(58) Field of Classification Search ................. 345/659, 345/649

See application file for complete search history.

(56) References Cited

U.S. PATENT DOCUMENTS

| | | | | |
|---|---|---|---|---|
| 4,267,555 | A * | 5/1981 | Boyd et al. | 345/10 |
| 4,831,368 | A * | 5/1989 | Masimo et al. | 345/27 |
| 5,030,944 | A * | 7/1991 | Masimo et al. | 345/659 |
| 5,134,390 | A * | 7/1992 | Kishimoto et al. | 345/659 |
| 5,189,404 | A * | 2/1993 | Masimo et al. | 345/659 |
| 5,329,289 | A * | 7/1994 | Sakamoto et al. | 345/659 |
| 5,764,291 | A * | 6/1998 | Fullam | 348/362 |
| 6,897,882 | B1 * | 5/2005 | Kim | 345/659 |
| 7,170,534 | B2 * | 1/2007 | Son et al. | 345/659 |
| 7,259,772 | B2 * | 8/2007 | Koh | 345/659 |
| 2001/0007469 | A1 | 7/2001 | Fuchimukai et al. | |
| 2003/0055597 | A1 * | 3/2003 | Berndorfer | 702/150 |
| 2003/0122781 | A1 * | 7/2003 | Koo | 345/158 |
| 2005/0041147 | A1 * | 2/2005 | Kim et al. | 348/511 |
| 2005/0143173 | A1 * | 6/2005 | Barney et al. | 463/37 |

(Continued)

FOREIGN PATENT DOCUMENTS

| | | |
|---|---|---|
| JP | 11-73291 | 3/1999 |

(Continued)

*Primary Examiner*—Amare Mengistu
*Assistant Examiner*—Gene W Lee
(74) *Attorney, Agent, or Firm*—Roylance, Abrams, Berdo & Goodman, L.L.P.

(57) ABSTRACT

A display apparatus having a display to display a picture thereon comprises a pivot sensor comprising a weight body, a housing in which the weight body is accommodated and movable as the display is pivoted, and a contact sensor placed in the housing and generating a sensing signal according to a pivoted angle of the display when contacting the weight body. A pivot sensing controller applies a predetermined driving voltage to the pivot sensor, and determines the pivot angle of the display on the basis of the sensing signal generated corresponding to the applied driving voltage. The pivot sensing apparatus requires a reduced number of pivot sensors and peripheral circuits to sense a pivot angle of a display panel. A display apparatus and system comprising the pivot sensing apparatus, and a method for sensing a pivot angle, are also disclosed.

20 Claims, 5 Drawing Sheets

21
MCU
32
31
30
29
26 27 28
VCC
VCC
R1a
R1b
10
13
15d
15a
15c
15b
11
R2a
R2b
GND
GND

U.S. PATENT DOCUMENTS

2006/0033760 A1 * 2/2006 Koh .......................... 345/649

FOREIGN PATENT DOCUMENTS

JP 11-196397 7/1999
KR 2003-0060043 7/2003
KR 2003-0088270 11/2003
KR 10-2004-0072201 8/2004

* cited by examiner

A

B

C

D

E

DISPLAY APPARATUS AND SYSTEM COMPRISING PIVOT SENSING APPARATUS, AND METHOD FOR SENSING A PIVOT ANGLE

CROSS-REFERENCE TO RELATED APPLICATIONS

This application claims the benefit under 35 U.S.C. §119 (a) from Korean Patent Application No. 2005-0000747, filed on Jan. 5, 2005, in the Korean Intellectual Property Office, the entire disclosure of which is hereby incorporated by reference.

BACKGROUND OF THE INVENTION

1. Field of the Invention

The present invention relates to a display apparatus and a display system comprising a pivot sensing apparatus, and method for sensing a pivot angle. An exemplary pivot sensing apparatus according to an aspect of the present invention senses a pivot angle of a display panel, an exemplary display apparatus according to an aspect of the present invention displays a picture rotated corresponding to the pivot angle, an exemplary display system according to yet another aspect of the present invention comprises the same, and an exemplary method according to yet another aspect of the present invention senses a pivot angle accordingly.

2. Description of the Related Art

In general, a display apparatus either displays a picture in a horizontal or vertical direction.

In a case of a pivotable display apparatus, it can display thereon a picture rotated according to selection of a user or a pivot angle of a display panel. Such a pivotable display apparatus conveniently allows a user to see a picture displayed either in the horizontal or vertical direction as desired.

FIG. 1 is a view illustrating an example of a pivot sensing circuit provided in a conventional display apparatus.

As shown in FIG. 1, a pivot sensing circuit provided in a conventional display apparatus comprises two pivot sensors 400 each provided with balls, and a microcontroller unit (MCU) 500 connected with the pivot sensors and determining a pivoted angle of a display panel on the basis of a signal outputted from the pivot sensors.

As the display panel is pivoted, the balls provided in the pivot sensor are changed in position, and thus signals corresponding to the changed position of the balls are transmitted to input ports of the MCU connected with the pivot sensors.

The MCU determines the pivot angle of the display panel on the basis of the signal received through the input ports thereof.

Relation between the signals transmitted to the input ports and the pivot angle is tabulated as follows.

TABLE 1

| | |
|---|---|
| Port 32 is high | 0° |
| Port 31 is high | 90° |
| Port 30 is high | 180° |
| Port 29 is high | 270° |

In order to determine these pivot angles, the pivot sensing circuit of the conventional display apparatus comprises two pivot sensors, four input ports, and peripheral circuits thereof. However, it is preferable for a pivot sensing circuit to have a simpler structure without variation in its function.

SUMMARY OF THE INVENTION

Accordingly, it is an exemplary aspect of the present invention to provide a pivot sensing apparatus with a reduced number of pivot sensors and their peripheral circuits to sense a pivot angle of a display panel, and display apparatus and system comprising the pivot sensing apparatus.

Additional exemplary aspects and/or advantages of the invention will be set forth in part in the following description of the exemplary embodiments of the present invention and, in part, may be appreciated, or learned through practice, by skilled artisans from the description of the exemplary embodiments of the present invention.

The foregoing and/or other exemplary aspects of the present invention are achieved by, inter alia, providing a display apparatus having a display part to display a picture thereon, the display apparatus comprising a pivot sensor comprising a weight body, a housing in which the weight body is accommodated and movable as the display part is pivoted, and a contact sensor placed in the housing and generating a sensing signal according to a pivot angle of the display part when contacting the weight body; and a pivot sensing controller applying a predetermined driving voltage to the pivot sensor, and determining the pivot angle of the display part on the basis of the sensing signal generated corresponding to the applied driving voltage.

According to an exemplary aspect of the present invention, the display apparatus further comprises a power supply, wherein the pivot sensing controller supplies the driving voltage from the power supply to the pivot sensor.

According to an exemplary aspect of the present invention, the weight body comprises a conductive ball.

According to an exemplary aspect of the present invention, the contact sensor comprises a first contact sensor to receive the driving voltage, and a second contact sensor to generate the sensing signal corresponding to the driving voltage applied to the first contact sensor when contacting the weight body.

According to an exemplary aspect of the present invention, the pivot sensing controller comprises a microcontroller unit (MCU) having an output port to output an applying signal for the driving voltage to be applied to the first contact sensor, and an input port to receive the sensing signal generated by the second contact sensor.

The foregoing and/or other exemplary aspects of the present invention are achieved by, inter alia, providing a display system comprising a signal processing part to process an input video signal, and a display part to display a picture based on the processed video signal, the display system further comprising a pivot sensor comprising a weight body, a housing in which the weight body is accommodated and movable as the display part is pivoted, and a contact sensor placed in the housing and generating a sensing signal according to a pivot angle of the display part when contacting the weight body; and a control part applying a predetermined driving voltage to the pivot sensor, determining the pivot angle of the display part on the basis of the sensing signal generated corresponding to the applied driving voltage, and controlling the signal processing part to make the display part display a picture rotated according to the pivot angle.

According to an exemplary aspect of the present invention, the display system further comprises a power supply, wherein the control part supplies the driving voltage from the power supply to the pivot sensor.

According to an exemplary aspect of the present invention, the control part comprises a pivot sensing controller controlling whether to apply the driving voltage to the pivot sensor, and determining the pivot angle of the display part on the basis of the sensing signal corresponding to the applied driving voltage; and a main body controller reading information about the pivot angle transmitted from the pivot sensing controller and controlling the signal processing part to make the display part display the picture rotated according to the pivot angle.

The foregoing and/or other exemplary aspects of the present invention are achieved by, inter alia, providing a pivot sensing apparatus to sense a pivot angle, comprising a weight body; a housing in which the weight body is accommodated and movable corresponding to the pivot angle; a contact sensor placed in the housing and generating a sensing signal according to the pivot angle when contacting the weight body; and a pivot sensing controller applying a predetermined driving voltage to the contact sensor, and determining the pivot angle on the basis of the sensing signal generated corresponding to the applied driving voltage.

According to an exemplary aspect of the present invention, the pivot sensing apparatus further comprises a power supply, wherein the pivot sensing controller supplies the driving voltage from the power supply to the contact sensor.

The foregoing and/or other exemplary aspects of the present invention are achieved by, inter alia, providing a method for sensing a pivot angle in a display apparatus having a display part to display a picture thereon, the display apparatus comprising a pivot sensor comprising a weight body, a housing in which the weight body is accommodated and movable as the display part is pivoted, and a contact sensor placed in the housing; and a pivot sensing controller. The exemplary method comprises: generating a sensing signal by, for example, the contact sensor generating a signal according to a pivot angle of the display part when contacting the weight body; and applying a predetermined driving voltage by, for example, the pivot sensing controller to the pivot sensor; and determining the pivot angle of the display part on the basis of the sensing signal generated corresponding to the applied driving voltage.

BRIEF DESCRIPTION OF THE DRAWINGS

These and other exemplary aspects and advantages of the exemplary embodiments of the present invention will become apparent and more readily appreciated from the following description of the exemplary embodiments, taken in conjunction with the accompany drawings, in which like reference symbols indicate the same or similar components, wherein.

DETAILED DESCRIPTION OF THE PREFERRED EMBODIMENT

Figure 1:
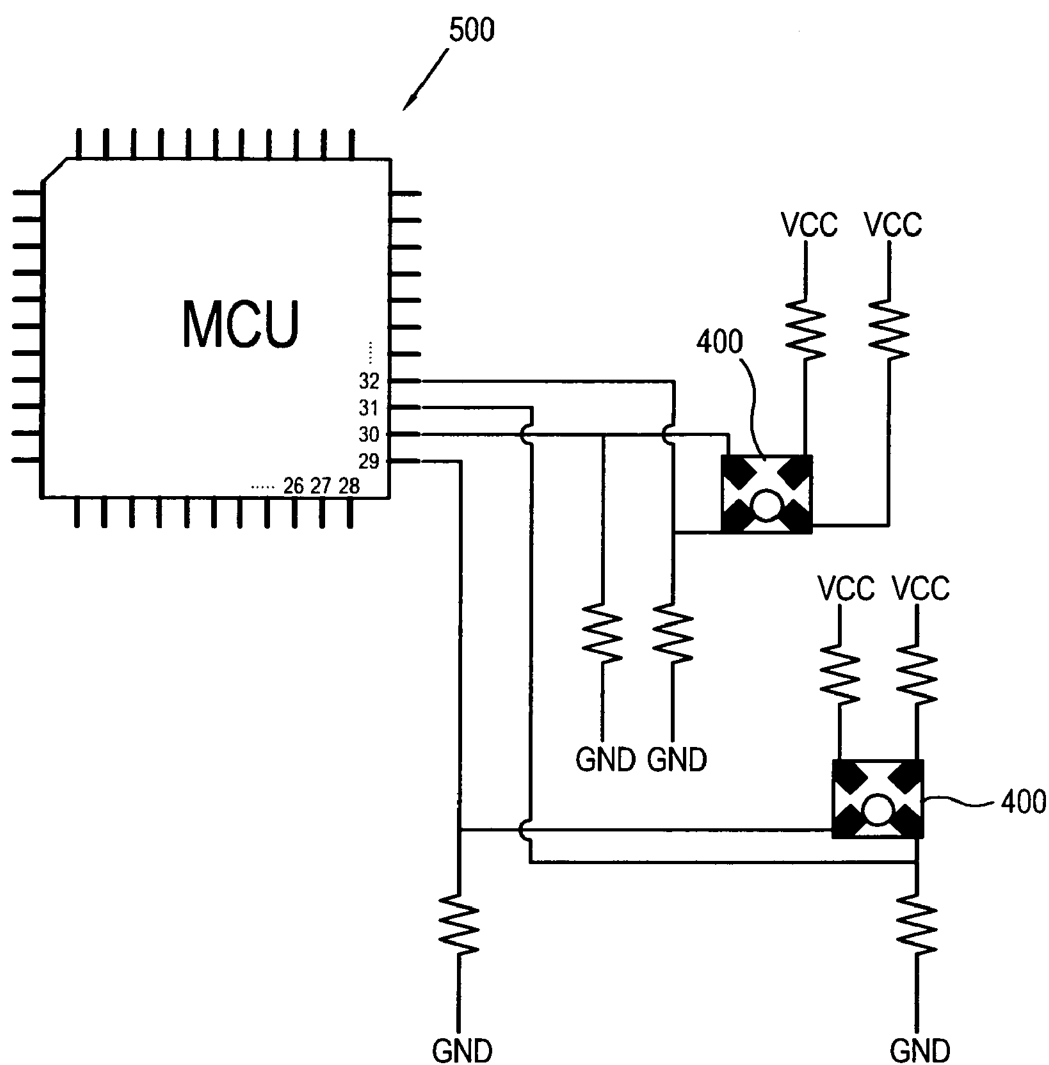
FIG. 1 is a view illustrating a pivot sensing circuit provided in a conventional display apparatus.

Reference will now be made in detail to the exemplary embodiments of the present invention, examples of which are illustrated in the accompanying drawings, wherein, as noted above, like reference numerals refer to like elements throughout. The exemplary embodiments of the present invention are described below so as to explain exemplary implementations of the exemplary embodiments of the present invention with reference to the drawing figures.

Hereinbelow, a display system according to an exemplary embodiment of the present invention will be described with reference to FIGS. 2 and 3.

Figure 2:
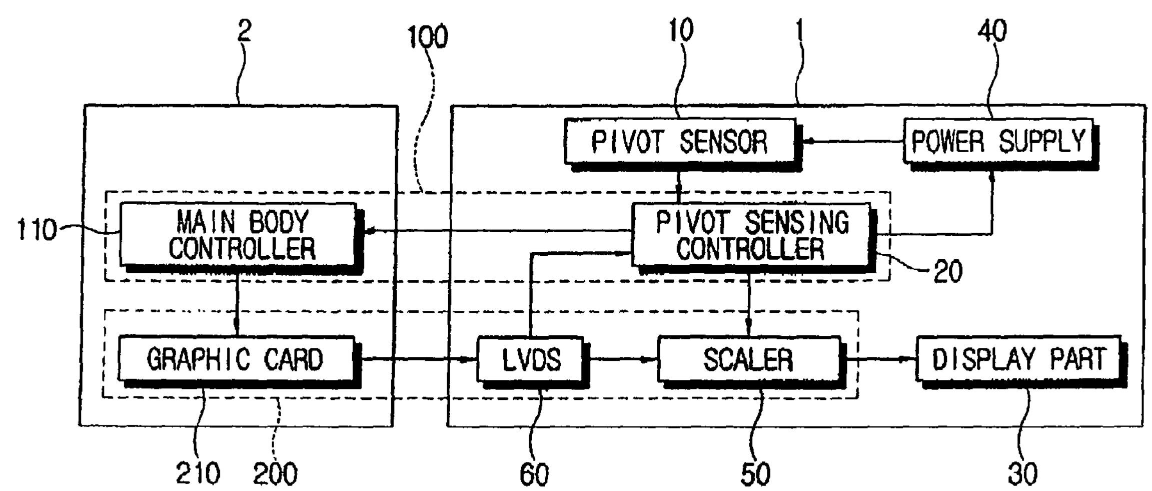
FIG. 2 is a control block diagram of a display system according to an exemplary embodiment of the present invention.
Figure 3:
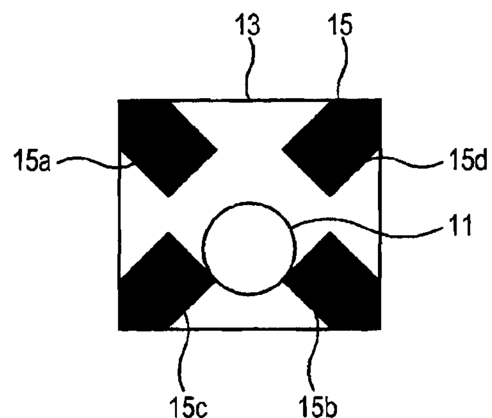
FIGS. 3A-3E are views illustrating movement of a weight body corresponding to pivot angles of a display apparatus according to an exemplary embodiment of the present invention.
Figure 3:
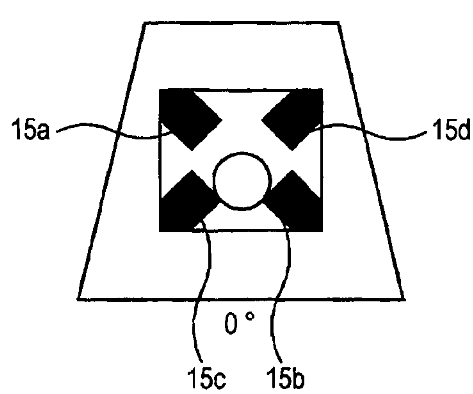
Figure 3:
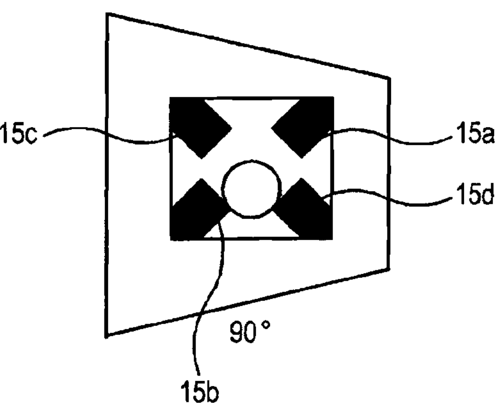
Figure 3:
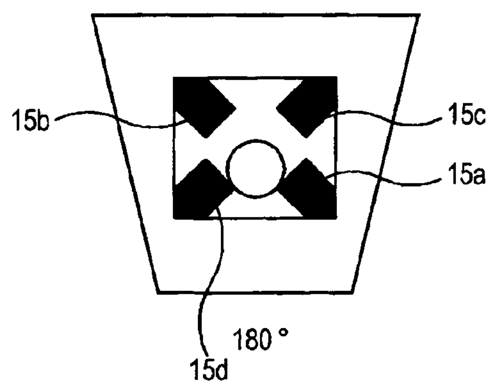
Figure 3:
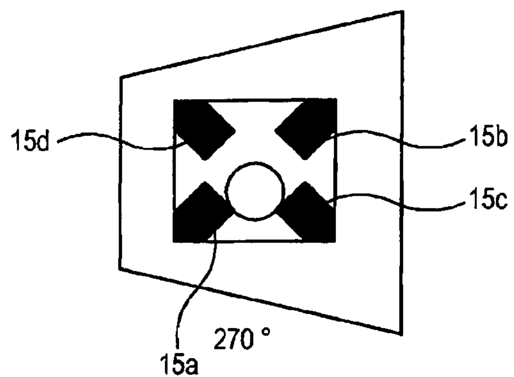

FIG. 2 illustrates a control block diagram of a display system according to an exemplary embodiment of the present invention, and FIG. 3 contains a view illustrating movement of a weight body corresponding to pivot angles of a display apparatus according to an exemplary embodiment of the present invention.

As shown in FIG. 2, a display system according to an exemplary embodiment of the present invention comprises a display apparatus 1, and a main body 2 used as a signal source. Further, the display system comprises a pivot angle sensor 10, a display part 30, a power supply 40, a control part 100, and a signal processing part 200.

Here, the pivot angle sensor 10 is placed inside the display apparatus 1, and rotates together with the display part 30 as the display part 30 is pivoted, thereby sensing the pivot direction and the pivot angle of the display part 30.

Referring to FIG. 3A, the pivot angle sensor 10 comprises a ball 11 used as a weight body and comprised of conductive material, a housing 13 movably accommodating the ball 11 therein, and contact sensors 15 placed at the respective inside corners of the housing 13 and outputting a sensing signal based on contact with the ball 11.

Further, FIG. 3B illustrates the position of the ball 11 when the display part 30 is pivoted at an angle of 0 degree. Likewise, FIGS. 3C-3E illustrate the positions of the ball 11 when the display part 30 is pivoted at angles of 90, 180 and 270 degrees, respectively. Thus, the ball 11 contacts the contact sensor 15 as the display part 30 is pivoted, and thus the contact sensor 15 outputs the sensing signal.

The display part 30 displays thereon a picture based on a processed signal. In an exemplary embodiment of the present invention, the display part 30 comprises a liquid crystal display (LCD) panel. Alternatively, the display part may comprise various display panels such as a plasma display panel (PDP), a digital light processing (DLP) panel, etc.

The control part 100 receives the sensing signal from the pivot sensor 10 and determines the pivot angle of the display part 30, thereby controlling the signal processing part 200 to display a picture as rotated according to the pivot angle. As shown in FIG. 2, the control part 100 comprises a pivot sensing controller 20 provided in the display apparatus 1, and a main body controller 110 provided in the main body 2.

The pivot sensing controller 20 determines the pivot angle of the display part 30 on the basis of the sensing signal outputted from the pivot sensor 10. In an exemplary embodiment of the present invention, the pivot sensing controller 20 comprises an MCU or the like. Further, the pivot sensing controller 20 controls information about the pivot angle to be stored in a memory or a register placed inside or outside the pivot sensing controller 20. Hereinafter, exemplary implementations of the pivot sensor 10 and the pivot sensing controller 20 will be described in more detail.

The main body controller 110 periodically outputs a request signal to the display apparatus 1, and requests the information about the current pivot angle of the display apparatus 1. Then, the main body controller 110 reads the information about the pivot angle of the display apparatus 1, and thus controls the signal processing part 200 on the basis of the read information. According to an exemplary embodiment of the present invention, the main body controller 110 comprises a microcomputer (MICOM) and a central processing unit (CPU).

The MICOM periodically generates an interrupt signal and requests the display apparatus 1 to transmit the information about the pivot angle thereof. Then, the MICOM reads the information about the current pivot angle of the display apparatus 1 and transmits it to the CPU. The CPU transmits a control signal based on the information of the MICOM to the signal processing part 200 to display a picture as rotated according to the pivot angle of the display part 30.

The signal processing part 200 comprises a graphic card 210 which is placed in the main body 2, and a low voltage differential signaling (LVDS) system 60 and a scaler 50 which are placed in the display apparatus 1. Here, the graphic card 210 processes an input video signal on the basis of the control signal of the MICOM or the CPU, thereby allowing a picture to be displayed as rotated according to the pivot angle of the display part 30. Further, the LVDS system 60 receives and converts the video signal processed in the main body 2. Further, the scaler 50 converts the video signal to have a vertical frequency, resolution, an aspect ratio suitable for the rated output power of the display part 30 on the basis of the control signal of the MCU.

Thus, a picture based on the video signal is displayed as rotated according to the pivot angle of the display part 30, wherein the pivot angle is sensed by the pivot sensor 10.

Further, the display apparatus 1 comprises the power supply 40 as shown in FIG. 2. According to an exemplary embodiment of the present invention, the pivot sensing controller 20 determines whether the power is supplied from the power supply 40 to the pivot sensor 10.

Hereinbelow, an exemplary implementation of a pivot sensing circuit of the display apparatus 1 comprising the pivot sensor 10 and the pivot sensing controller 20 will be described with reference to FIG. 4.

Figure 4:
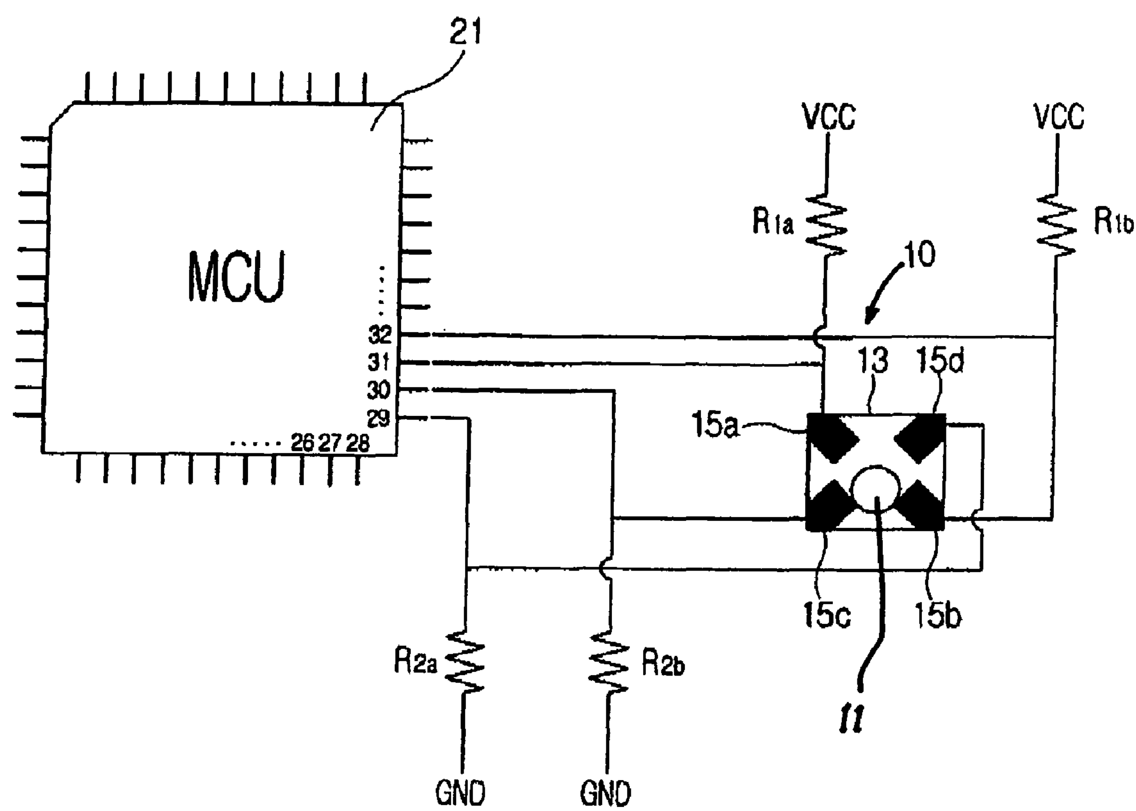
FIG. 4 is a view illustrating a pivot sensing circuit provided in the display apparatus according to an exemplary embodiment of the present invention.

As shown in FIG. 4, a pivot sensing circuit according to an exemplary embodiment of the present invention comprises the pivot sensor 10 to sense the pivot angle of the display part 30, the MCU to determine the pivot angle on the basis of the sensing signal of the pivot sensor 10, and their peripheral circuits.

The pivot sensor 10 comprises the ball 11 movable within the housing 13 in correspondence to pivoting of the display apparatus 1, and the contact sensors 15*a*-15*d* placed at the respective inside corners of the housing 13.

The respective contact sensors 15*a*-15*d* comprise first contact sensors 15*a* and 15*b* to receive voltage from the power supply 40 or the MCU, and second contact sensors 15*c* and 15*d* to output the sensing signal based on contact with the ball 11.

The MCU comprises output ports 31 and 32 to apply a predetermined signal to the first contact sensors 15*a* and 15*b*, and input ports 29 and 30 to receive the sensing signal from the second contact sensors 15*d* and 15*c*.

In an exemplary embodiment of the present invention, the MCU applies a low or high signal through the output ports 31 and 32 according to a setting program. When the MCU applies the low signal, the power of the power supply 40 is supplied to a corresponding port. On the other hand, when the MCU applies the high signal, a predetermined voltage is applied to the first contact sensors 15*a* and 15*b*.

Meanwhile, according to an exemplary embodiment of the present invention, the MCU may directly apply a corresponding voltage to the first contact sensors 15*a* and 15*b* through the output ports, or may transmit the voltage of the power from the external power supply 40 to the first contact sensors 15*a* and 15*b*.

In the ports of the MCU, the input/output signals according to the pivot angles will be tabulated as follows.

TABLE 2

| | port 31 has high output | port 32 has high output |
|---|---|---|
| 0° | port29, port 30: low | port 29: low,<br>port 30: high |
| 90° | port 29, port 30: low | port 29: high,<br>port 30: low |
| 180° | port 29: high,<br>port 30: low | port 29, port 30: low |
| 270° | port 29: low,<br>port 30: high | port 29, port 30: low |

As shown in Table 2, in a case where port 31 of the MCU outputs the high signal and port 32 outputs the low signal, that is, when the ball 11 is positioned between the first contact sensor 15*a* and the second contact sensor 15*d*, the second contact sensor 15*d* outputs the sensing signal, so that the ports 29 and 30 detect the high and low signals, respectively.

In this case, the MCU determines the pivot angle on the basis of the output signals of the ports 31 and 32, and the input signals of the ports 29 and 30. In the foregoing exemplary embodiment of the present invention, the MCU determines the pivot angle as 180 degrees.

Thus, according to an exemplary embodiment of the present invention, the MCU can determine the pivot angle of the display part 30 on the basis of the signals of the input/output ports. Detailed descriptions for other combinations of the input/output signals will be appreciated by skilled artisans, and therefore, are omitted.

Figure 5:
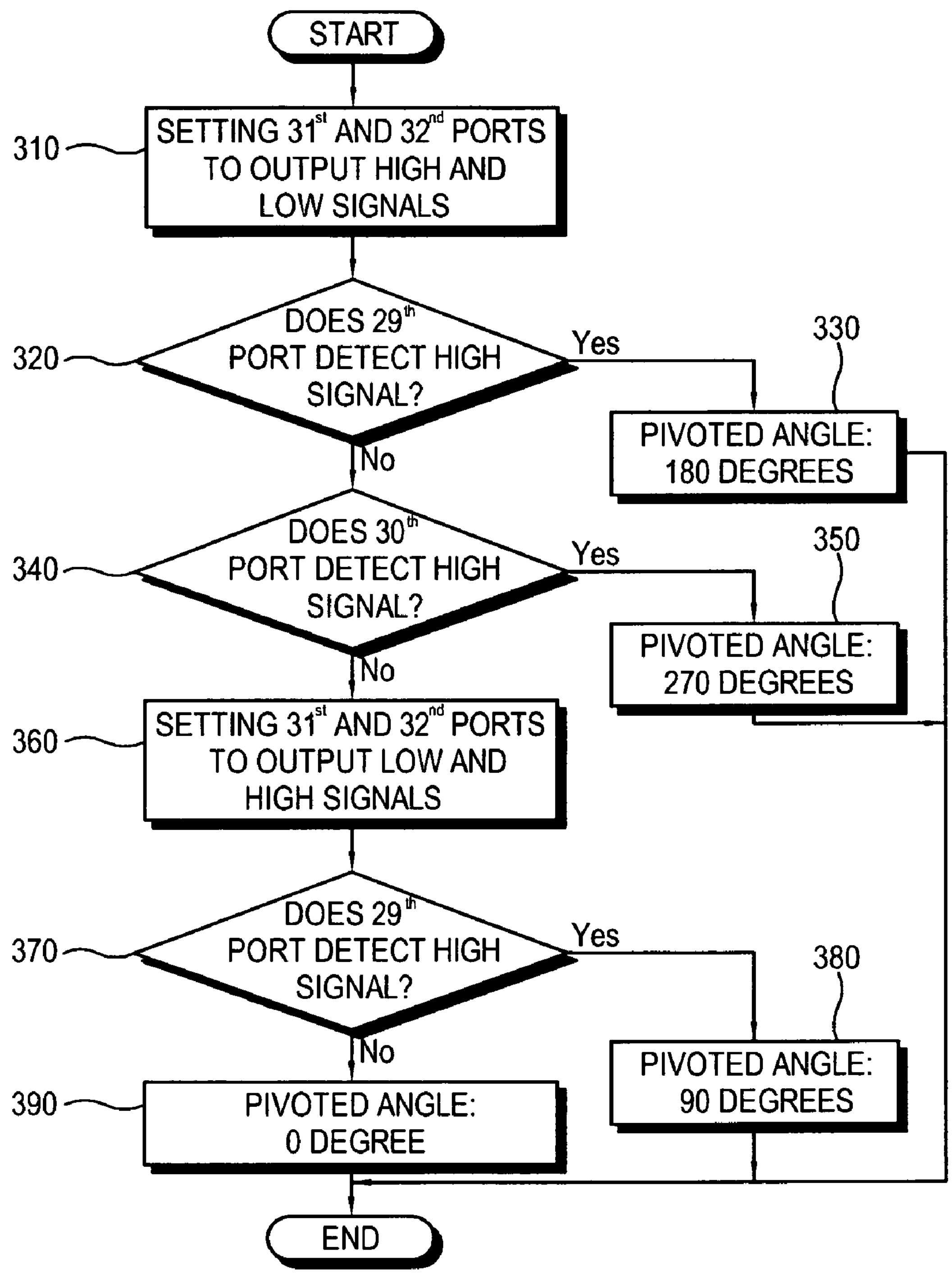
FIG. 5 is a control flowchart illustrating an exemplary process for sensing a pivot angle of the exemplary display apparatus according to an exemplary embodiment of the present invention.

FIG. 5 is a control flowchart illustrating an exemplary method for sensing a pivot angle of the display apparatus according to an exemplary embodiment of the present invention.

As shown in FIG. 5, at operation 310, ports 31 and 32 of the MCU are set as default to output the high and low signals, respectively.

At operation 320, the MCU determines whether or not the high signal is inputted through port 29 in response to the output signals of ports 31 and 32 of the MCU. When the MCU receives the high signal through port 29, at operation 330, the MCU determines the pivot angle of the display part 30 as 180 degrees.

On the other hand, when the MCU receives the low signal through the port 29, at operation 340, the MCU determines whether or not the high signal is inputted through port 30. When the MCU receives the high signal through port 30, at operation 350, the MCU determines the pivot angle of the display part 30 as 270 degrees.

On the other hand, when the MCU receives the low signal through both ports 29 and 30, at operation 360, ports 31 and 32 of the MCU are set to output the low and high signals, respectively.

Then, at operation 370, the MCU determines whether or not the high signal is inputted through port 29 in response to the output signals of ports 31 and 32 of the MCU. When the MCU receives the high signal through port 29, at operation 380, the MCU determines the pivot angle of the display part 30 as 90 degrees.

On the other hand, when the MCU receives the low signal through port 29, at operation 390, the MCU determines pivot angle of the display part 30 as 0 degrees. At this time, the high signal is inputted through port 30.

As described above, according to an exemplary embodiment of the present invention, the MCU determines the pivoted angle of the display part on the basis of the input/output signals transmitted through four input/output ports connected with the pivot sensor 10, stores information about the determined pivoted angle in the internal register or the memory, and transmits the information to the main body 2 in response to a request of the main body 2.

Besides the foregoing exemplary setting, a skilled artisan would appreciate that the output ports of the MCU may be set variously without departing from the scope of the present invention.

As described above, exemplary embodiments of the present invention provide a pivot sensing apparatus with a reduced number of pivot sensors and their peripheral circuits to sense a pivot angle of a display panel, and display apparatus and system comprising the pivot sensing apparatus, and a method for sensing a pivot angle.

Although exemplary embodiments of the present invention have been shown and described, it will be appreciated by those skilled in the art that changes and variations may be made without departing from the principles and spirit of the invention, the scope of which is defined in the appended claims and their equivalents.

What is claimed is:

1. A display apparatus comprising:

a display;

a pivot sensor comprising:

a housing;

a weight body movably disposed within the housing; and a contact sensor disposed within the housing;

wherein the contact sensor generates a sensing signal according to a pivot angle of the display when the weight body moves within the housing as the display is pivoted and contacts the contact sensor; and a pivot sensing controller selectively applying a driving voltage to the pivot sensor, and determining the pivot angle of the display on the basis of the sensing signal corresponding to the applied driving voltage;

wherein the contact sensor comprises:

a plurality of first contact sensors to receive the driving voltage, respectively; and a plurality of second contact sensors to generate the sensing signal corresponding to the driving voltage selectively applied to one of the plurality of first contact sensors when the weight body contacts the second contact sensor; and wherein the pivot sensing controller comprises a microcontroller unit (MCU), the microcontroller unit comprising:

a plurality of output ports to output an applying signal for the driving voltage to be selectively applied to one of the plurality of first contact sensors, respectively; and a plurality of input ports to receive the sensing signal generated by the plurality of second contact sensors, respectively, wherein the weight body contacts one of the plurality of first contact sensors and one of the plurality of second contact sensors together, at each of a finite number of pivot angles which are designed to be sensed as the display is pivoted.

2. The display apparatus according to claim 1, wherein the weight body comprises a conductive ball.

3. A display system comprising:

a signal processor which processes an input video signal;

a display which displays an image based on the processed video signal;

a pivot sensor comprising:

a housing;

a weight body movably disposed within the housing; and a contact sensor disposed within the housing;

wherein the contact sensor generates a sensing signal according to a pivot angle of the display when the weight body moves within the housing as the display is pivoted and contacts the contact sensor; and a controller selectively applying a driving voltage to the pivot sensor, determining the pivot angle of the display on the basis of the sensing signal corresponding to the applied driving voltage, and controlling the signal processor to facilitate the display to display the image rotated according to the pivot angle;

wherein the contact sensor comprises:

a plurality of first contact sensors to receive the driving voltage, respectively; and a plurality of second contact sensors to generate the sensing signal corresponding to the driving voltage selectively applied to the plurality of first contact sensors when the weight body contacts the second contact sensor;

wherein the controller comprises:

a pivot sensing controller controlling whether to apply the driving voltage to the pivot sensor, and determining the pivot angle of the display on the basis of the sensing signal corresponding to the applied driving voltage; and a main body controller reading information comprising the pivot angle transmitted from the pivot sensing controller, and controlling the signal processing to facilitate the display to display the image rotated according to the pivot angle;

wherein the pivot sensing controller comprises a microcontroller unit (MCU), the microcontroller unit comprising:

a plurality of output ports to output an applying signal for the driving voltage to be selectively applied to one of the plurality of first contact sensors, respectively; and a plurality of input ports to receive the sensing signal generated by the plurality of second contact sensors, respectively, wherein the weight body contacts one of the plurality of first contact sensors and one of the plurality of second contact sensors together, at each of a finite number of pivot angles which are designed to be sensed as the display is pivoted.

4. The display system according to claim 3, wherein the weight body comprises a conductive ball.

5. A pivot sensing apparatus for a display, the apparatus comprising:

a housing;

a weight body movably disposed within the housing;

a contact sensor disposed within the housing;

wherein the contact sensor generates a sensing signal according to a pivot angle of the display when the weight body moves within the housing and contacts the contact sensor; and a pivot sensing controller selectively applying a predetermined driving voltage to the contact sensor, and determining the pivot angle of the display on the basis of the sensing signal corresponding to the applied driving voltage;

wherein the contact sensor comprises:

a plurality of first contact sensors to receive the driving voltage, respectively; and a plurality of second contact sensors to generate the sensing signal corresponding to the driving voltage selectively applied to one of the plurality of first contact sensors when the weight body contacts the second contact sensor;

wherein the pivot sensing controller comprises a microcontroller unit (MCU), the microcontroller unit comprising:

a plurality of output ports to output an applying signal for the driving voltage to be selectively applied to one of the plurality of first contact sensors, respectively; and a plurality of input ports to receive the sensing signal generated by the plurality of second contact sensors, respectively, wherein the weight body contacts one of the plurality of first contact sensors and one of the plurality of second contact sensors together, at each of a finite number of pivot angles which are designed to be sensed as the display is provided.

6. The pivot sensing apparatus according to claim 5, wherein the weight body comprises a conductive ball.

7. A method for sensing a pivot angle of a display which displays an image, wherein a pivot sensor comprises a housing, a weight body movably disposed within the housing, and a contact sensor disposed within the housing, the method comprising:

applying a driving voltage from a pivot sensing controller to the pivot sensor;

generating by the pivot sensor a sensing signal when the weight body moves within the housing and contacts the contact sensor;

determining by the pivot sensing controller the pivot angle on the basis of the sensing signal corresponding to the applied driving voltage; and displaying the image on the display according to the determined pivot angle;

wherein:

the contact sensor comprises a plurality of first contact sensors and a plurality of second contact sensors;

the applying of the driving voltage comprises selectively applying the driving voltage to one of the plurality of first contact sensors; and the generating of the sensing signal is performed such that the driving voltage is selectively applied from the pivot sensing controller to one of the plurality of first contact sensors when the weight body contacts the second contact sensor, wherein the weight body contacts one of the plurality of first contact sensors and one of the plurality of second contact sensors together, at each of a finite number of pivot angles which are designed to be sensed as the display is pivoted.

8. The method according to claim 7, wherein the weight body comprises a conductive ball.

9. The display apparatus according to claim 1, wherein the pivot sensing controller has a plurality of ports including a plurality of input ports and a plurality of output ports, wherein each input port receives a separate input signal from the pivot sensor and each output port outputs a separate output signal to the pivot sensor, and wherein the pivot sensing controller determines the pivot angle of the display on the basis of the input signals received at the input ports and the output signals output from the output ports.

10. The display apparatus according to claim 1, wherein the display is rotatably moveable in both a horizontal and a vertical direction, and is operable to display the image in both the horizontal direction and the vertical direction, and wherein the sensing signal includes a first and a second sensing signal, wherein the pivot sensor is operable to generate the first sensing signal if the display is rotatably moved in the horizontal direction and the pivot sensor is operable to generate the second sensing signal if the display is rotatably moved in the vertical direction.

11. The display apparatus according to claim 1, wherein the display is rotatably moveable from 0 degrees to 270 degrees, and wherein the sensing signal includes a first sensing signal, a second sensing signal, a third sensing signal and a fourth sensing signal, and the pivot sensor generates the first sensing signal if the display is at 0 degrees, the second sensing signal if the display is at 90 degrees, the third sensing signal if the display is at 180 degrees and the fourth sensing signal if the display is at 270 degrees.

12. The display system according to claim 3, wherein the controller has a plurality of ports including a plurality of input ports and a plurality of output ports, wherein each input port receives a separate input signal from the pivot sensor and each output port outputs a separate output signal to the pivot sensor, and wherein the controller determines the pivot angle of the display on the basis of the input signals received at the input ports and the output signals output from the output ports.

13. The display system according to claim 3, wherein the display is rotatably moveable in both a horizontal and a vertical direction, and is operable to display the image in both the horizontal direction and the vertical direction, wherein the sensing signal includes a first and a second sensing signal, wherein the pivot sensor is operable to generate the first sensing signal if the display is rotatably moved in the horizontal direction and the pivot sensor is operable to generate the second sensing signal if the display is rotatably moved in the vertical direction.

14. The display system according to claim 3, wherein the display is rotatably moveable from 0 degrees to 270 degrees, and wherein the sensing signal includes a first sensing signal, a second sensing signal, a third sensing signal and a fourth sensing signal, and the pivot sensor generates the first sensing signal if the display is at 0 degrees, the second sensing signal if the display is at 90 degrees, the third sensing signal if the display is at 180 degrees and the fourth sensing signal if the display is at 270 degrees.

15. The pivot sensing apparatus according to claim 5, wherein the pivot sensing controller has a plurality of ports including a plurality of input ports and a plurality of output ports, wherein each input port receives a separate input signal from the contact sensor and each output port outputs a separate output signal to the contact sensor, and wherein the pivot sensing controller determines the pivot angle of the display on the basis of the input signals received at the input ports and the output signals output from the output ports.

16. The pivot sensing apparatus according to claim 5, wherein the display is rotatably moveable in both a horizontal and a vertical direction, and is operable to display the image in both the horizontal direction and the vertical direction, and wherein the sensing signal includes a first and a second sensing signal, wherein the pivot sensing apparatus is operable to generate the first sensing signal if the display is rotatably moved in the horizontal direction and the pivot sensing apparatus is operable to generate the second sensing signal if the display is rotatably moved in the vertical direction.

17. The pivot sensing apparatus according to claim 5, wherein the display is rotatably moveable from 0 degrees to 270 degrees, and wherein the sensing signal includes a first sensing signal, a second sensing signal, a third sensing signal and a fourth sensing signal, and the pivot sensor generates the first sensing signal if the display is at 0 degrees, the second sensing signal if the display is at 90 degrees, the third sensing signal if the display is at 180 degrees and the fourth sensing signal if the display is at 270 degrees.

18. The method according to claim 7, wherein the driving voltage comprises a plurality of input signals applied by the pivot sensing controller as input to the pivot sensor, wherein the sensing signal comprises a plurality of output signals generated by the pivot sensor when the input signals are received from the pivot sensing controller, and the weight body moves within the housing and contacts the contact sensor, and wherein the pivot sensing controller determines the pivot angle of the display on the basis of the output signals received at the input ports and the input signals output from the output ports.

19. The method according to claim 7, wherein the display is rotatably moveable in both a horizontal and a vertical direction, and is operable to display the image in both the horizontal direction and the vertical direction, wherein the sensing signal includes a first and a second sensing signal, wherein the pivot sensor is operable to generate the first sensing signal if the display is rotatably moved in the horizontal direction and the pivot sensor is operable to generate the second sensing signal if the display is rotatably moved in the vertical direction, and wherein the displaying is performed such that the image is displayed in the horizontal direction or the vertical direction, according to the determined pivot angle.

20. The method according to claim 7, wherein the display is rotatably moveable from 0 degrees to 270 degrees, and wherein the sensing signal includes a first sensing signal, a second sensing signal, a third sensing signal and a fourth sensing signal, and the pivot sensor generates the first sensing signal if the display is at 0 degrees, the second sensing signal if the display is at 90 degrees, the third sensing signal if the display is at 180 degrees and the fourth sensing signal if the display is at 270 degrees.

* * * * *